Dec. 31, 1957    H. F. GREINER    2,818,285
SEALING ASSEMBLY
Filed May 19, 1954
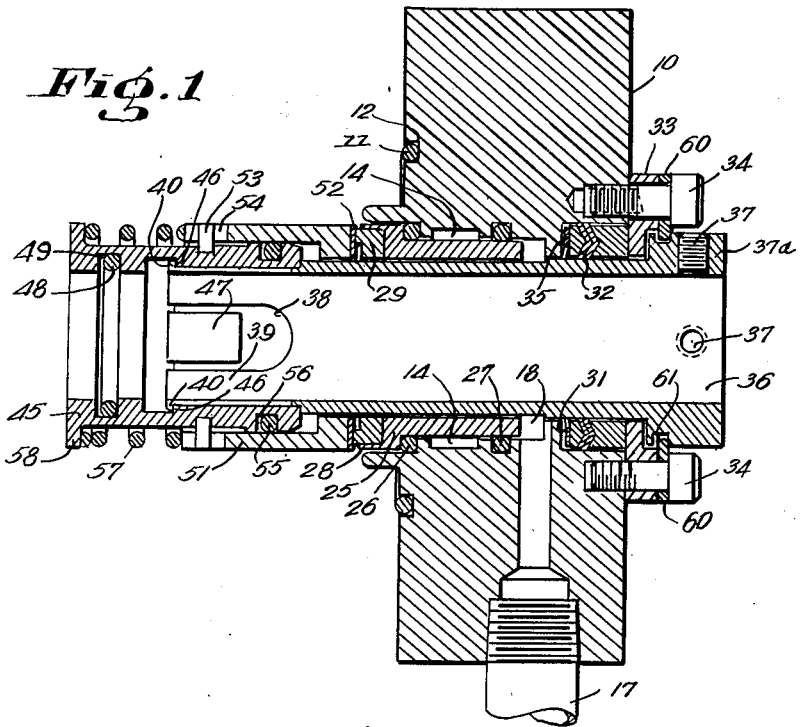
INVENTOR.
HAROLD F. GREINER
BY
*Roland V. Patrick*
ATTORNEY

United States Patent Office 2,818,285
Patented Dec. 31, 1957

2,818,285

SEALING ASSEMBLY

Harold F. Greiner, Warwick, R. I., assignor to Sealol Corporation, Providence, R. I., a corporation of Rhode Island Application May 19, 1954, Serial No. 430,763

3 Claims. (Cl. 286—11.15)

This invention relates to an assembly for providing a fluid seal between a rotating shaft and a surrounding housing or casing, and pertains more specifically to a stuffing box seal.

One object of this invention is to provide a sealing assembly or unit having a rotary type seal which is easily constructed and readily assembled into a unitary device, ready for attachment to a stuffing box.

Another object is to provide telescoping sleeves for use in a sealing assembly having an internal snap lock construction to provide a unit sealing assembly.

A further object is to provide such a sealing assembly which is pre-loaded to set the seal at a predetermined spring loading and permit attachment of the unit without careful adjustment to load the spring.

Other and further objects will be apparent from the drawing and the description which follows.

In the drawings:

Fig. 1 is a longitudinal section of one embodiment of my device taken along the line 1—1 of Fig. 2, and Fig. 2 is an end elevation of the embodiment shown in Fig. 1.

As shown in the drawings, a housing 10 is provided with an O-ring 11 or similar gasketing device mounted in an annular channel 12 whereby the housing may be sealed to the face of a stuffing box (not shown) by means of bolts passing through bolt holes 13, 13. The housing 10 is provided with an annular internal channel 14 through which cooling water may be circulated through inlet port 15 and outlet port 16. A drain port 17 is provided to drain any accumulated liquid from annular channel 18. A vent port 19 is also provided together with a circulating port 20 through which additional cooling medium may be circulated through the housing and stuffing box.

Mounted within the central aperture of the housing is an annular member 25 which is sealed to the housing by means of O-rings 26 and 27. Annular member 25 is provided with an axially extending flange 28 within which is mounted an annular sealing surface member 29. Sealing surface member 29 is a press fit with annular member 25 and is therefore stationary with respect to housing 10 although these two members may readily be removed as a unit from the housing if desired for purposes of replacement or repair.

At the opposite face of housing 10 an annular channel 31 is provided around the central aperture within which a suitable soft packing such as automatic V packing 32 may be provided which is held in place under pressure by means of annular collar 33 secured to the face of housing 10 by means of bolts 34, 34 and an annular distorted ring-type spring 35 mounted between the base of channel 31 and the bottom of packing 32.

Mounted concentrically within the central aperture of housing 10 for attachment to a rotating shaft is sleeve member 36 which may be fixed to the shaft by means of socket-headed set screws 37, 37 in flange 37a which is integral with the outer end of sleeve member 36. The inner end of sleeve member 36 is slotted at 38 to provide tongues 39, 39 which are radially resilient, these tongues carrying at their ends a radially outwardly extending flange or detent 40. Telescopically mounted over the tongued end of sleeve member 36 is a second sleeve member 45 which is provided with an internal annular shoulder 46 which mates with detents 40 to hold the sleeve members 36, 45 in telescoped arrangement, the detents being locked in mating engagement with shoulder 46 by the shaft when sleeve members 36, 45 are mounted on the shaft. Sleeve member 45 is also provided with internal driving lugs 47 which seat in slots 38 so that sleeve members 45 and 36 rotate together along with the shaft. An O-ring 48 mounted in an internal channel 49 in sleeve member 45 serves to seal the latter against the shaft.

Encircling the assembled sleeve members is a sealing ring 51 having a sealing face 52 abutting annular sealing surface 29 to form a radial seal. Sealing ring 51 is secured to sleeve member 45 by means of driving pins 53 which are seated in axial slots 54 in the sealing ring 51 so as to lock sealing ring 51 for rotation with sleeve members 36 and 45, while permitting limited axial movement of the sealing ring with respect to the sleeve members. An O-ring 55 mounted in an external channel 56 of sleeve member 45 bears against the inner face of sealing ring 51 and serves to seal the sealing ring to the sleeve member.

In order to provide sealing pressure between the rotating sealing ring 51 and fixed annular sealing surface 29, a compression coil spring 57 is provided which encircles sleeve member 45 between sealing ring 51 and a radially outwardly extending shoulder 58 which is provided adjacent the end of sleeve member 45 remote from sleeve member 36.

In order to ensure proper positioning of sleeve member 36 upon the shaft so as to provide the necessary axial clearance between sleeve member 36 and annular clamping ring 33, even though spring 57 is pre-loaded, detents in the form of eccentric washers 60 are mounted on bolts 34 to engage an annular channel 61 in sleeve member 36, as described and claimed in the copending application of Justus B. Stevens, Ser. No. 430,753, filed May 19, 1954.

It will thus be seen that the embodiment shown in the drawing includes two relatively rotatable assemblies, one assembly including sleeve members 36 and 45, sealing ring 51 and sealing face 52, and compression spring 57, all of which may be attached to the shaft by means of set screws 37 for rotation with it, the other assembly including housing 10, annular member 25, sealing member 29, and collar 33 with its associated packing 32 and eccentric washers 60, all of which may be attached to a stationary gland. The first assembly axially embraces the second, as shown in Fig. 1.

In assembling the device annular member 25 together with annular sealing surface 29 are inserted at one side of housing 10, spring 35 and packing 32 are assembled in their channel at the opposite or outer face of housing 10 held loosely in place by means of clamp ring 33, eccentric washers 60 being turned about 180° from the position shown in Fig. 1. Sleeve member 36 is then inserted through the housing and washers 60 rotated to engage the sleeve and hold it temporarily in fixed axial position. Sealing ring 51 and spring 57 are then pressed in position over the inner end of sleeve member 36 and sleeve member 45 is forced axially over tongues 39 inside of sealing ring 51. Because of their resiliency tongues 39 are forced radially inwardly during this operation while spring 57 is compressed, until detents 40 snap into position over shoulder 46 to hold the assembly together. Driving pins 53 are then inserted. Bolts 34 are tightened to apply pressure to packing 32, forcing it radially inwardly against sleeve member 36. The assembly is then ready for attachment to a shaft and housing, bolts inserted through holes 13 to lock housing 10 to a stationary gland or stuffing box and set screws 37 being tightened to lock sleeve member 36 to the shaft. Thereafter, eccentric washers 60 are rotated to an inoperative position.

Although I have herein described a specific embodiment of my invention, I do not intend to limit myself soley thereto, but to include all of the obvious variations and modifications within the spirit and scope of the appended claims.

I claim:

1. A sealing unit for a rotating shaft extending through a casing, said unit comprising two relatively rotatable assemblies, one for attachment to said casing and the other for attachment to a shaft extending through said casing, and including annular abutting relatively rotatable sealing surfaces providing a radial seal between said assemblies, one of said assemblies including a pair of telescoping elements, the last said assembly extending through the other of said assemblies, one of said telescoping elements having a plurality of radially resilient tongue members having radially extending detents, and the other telescoping element having a radial shoulder to hold said detents, a spring seated between the telescoping elements of said one assembly and the sealing surface rotatable therewith, and means releasably holding the telescoping elements in fixed axial relation with respect to the other assembly to load said spring through said detents to maintain said sealing surfaces at a predetermined set engagement during respective attachment of said assemblies to a casing and shaft.

2. A sealing unit for a rotatable shaft comprising a housing having an annular sealing surface, a sleeve member extending through said housing concentrically disposed within said annular sealing surface and having a radially outwardly extending flange adjacent an end, said sleeve member being adapted to be attached to said shaft, an axially movable sealing ring encircling said sleeve member intermediate its ends, said sealing ring having a sealing face bearing against said annular sealing surface, a compression spring encircling said sleeve member between said flange and said sealing ring to urge said ring against said annular sealing surface, means connecting said sealing ring and said sleeve member for rotation with said shaft, said sleeve member including two elements telescoped one within the other, the outer element having an internal annular shoulder, the inner element having a plurality of radially resilient tongue members having radially outwardly extending detents engaging said internal shoulder to hold said elements in telescoped relation, said detents being locked in mating engagement with said shoulder when said sleeve member is mounted on said shaft, and means for releasably locking said sleeve member in axially fixed position with respect to said housing to load said spring through said detents to maintain said sealing surface and sealing face in predetermined engagement during attachment of the unit to the shaft.

3. A sealing unit as defined in claim 2 in which said locking means includes a detent releasably secured to said housing for engaging said sleeve member.

References Cited in the file of this patent

UNITED STATES PATENTS

| 470,397 | Jerome | Mar. 8, 1892 |
| 1,762,776 | Gardner | June 10, 1930 |
| 2,306,417 | Weissner | Dec. 29, 1942 |
| 2,555,483 | Grant | June 5, 1951 |
| 2,639,170 | Schick et al. | May 19, 1953 |

FOREIGN PATENTS

| 649,863 | Great Britain | Feb. 7, 1951 |